(No Model.)
J. B. MUELLER.
HORSE COLLAR.
No. 478,452.　　　　　　　　Patented July 5, 1892.
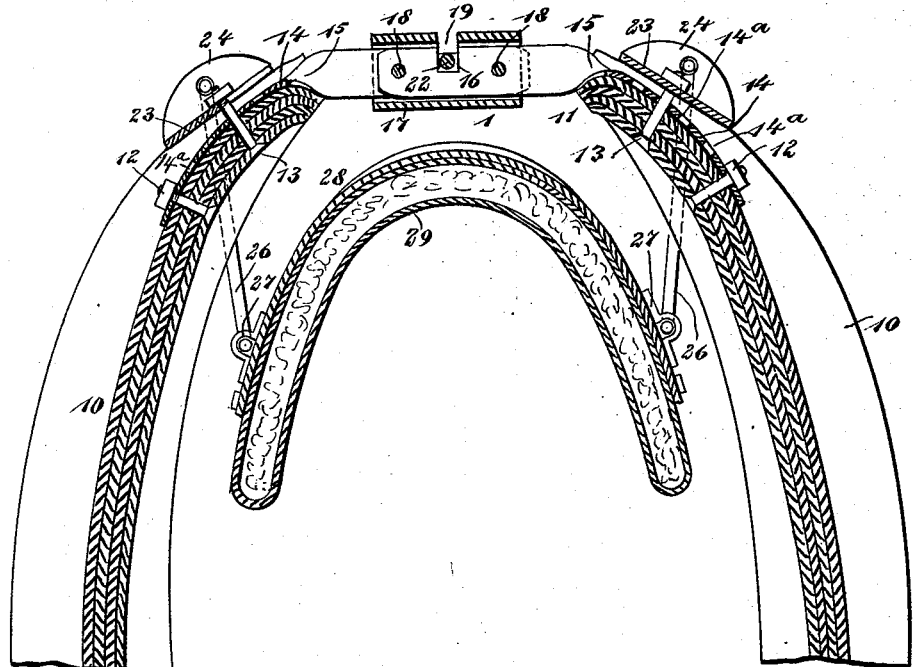
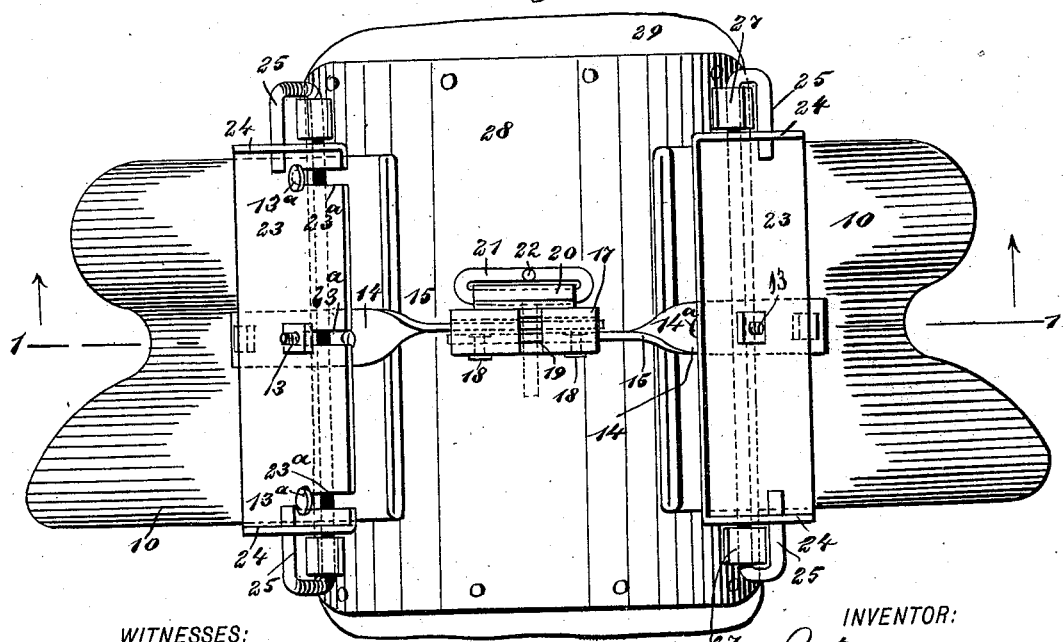
WITNESSES:
F. McArdle
C. Sedgwick
INVENTOR:
J. B. Mueller
BY
ATTORNEYS.
THE NORRIS PETERS CO., PHOTO-LITHO., WASHINGTON, D. C.

UNITED STATES PATENT OFFICE.

JOHN B. MUELLER, OF STREATOR, ILLINOIS.

HORSE-COLLAR.

SPECIFICATION forming part of Letters Patent No. 478,452, dated July 5, 1892.

Application filed January 26, 1892. Serial No. 419,274. (No model.)

*To all whom it may concern:*

Be it known that I, JOHN B. MUELLER, of Streator, in the county of La Salle and State of Illinois, have invented a new and Improved Horse-Collar Attachment, of which the following is a full, clear, and exact description.

My invention relates to improvements in attachments for horse-collars; and the object of my invention is to provide the common form of horse-collar with an easily-operated coupling by means of which the two members of the collar may be secured together and also held the desired distance apart, and also to provide the collar with a pad which is pivotally connected with the collar in such a way that the movements and vibrations of the collar will not be transmitted to the pad, and consequently the pad will lie motionless upon the neck of the horse without injuring the neck.

To this end my invention consists of certain features of construction and combination of parts, which will be hereinafter described and claimed.

Reference is to be had to the accompanying drawings, forming a part of this specification, in which similar figures of reference indicate corresponding parts in both the views.

Figure 1 is a broken vertical cross-section of a horse-collar provided with my improved attachment, taken on the line 1 1 in Fig. 2; and Fig. 2 is a plan view of the same.

The collar 10 is of the usual kind, having an opening 11 at the top, and secured to the upper end of each member of the collar, adjacent to the opening, by bolts 12 and 13 is a flat bar 14, which has a series of holes 14$^a$ therein to enable it to be adjusted on the collar, and each bar 14 is twisted, as shown at 15, and extends transversely across the collar-opening, the two bars overlapping each other. The adjacent portions of the bars 14 are provided with transverse notches or recesses 16, which are adapted to register and which enable them to be fastened together, as described below. One of the bars carries near its free end a keeper 17, adapted to embrace both bars and which is secured to the bar by bolts or rivets 18, and the keeper is slotted transversely on the top, as shown at 19, which slot is adapted to register with the notches 16 of the bars. On one side of the keeper 17 is a smaller keeper 20, on which is pivoted a metallic loop 21, which has a projecting finger 22 thereon, which finger serves as a catch and is adapted to be tipped into a horizontal position, so as to extend through the slot 19 and the notches 16 of the bars, and the finger or catch will thus hold the two bars in a fixed position in relation to each other. On the outside of each member of the collar 10 and adjacent to the opening 11 are metallic bearing-pieces 23, over which the hame-straps may extend, and these bearing-pieces are held in place by the bolts 13, although one of them is provided with a series of slots 23$^a$ near one edge, and the bolts 13 and 13$^a$ extend through these slots and into the collar, so as to firmly bind the bearing-pieces in place, and, if desired, both bearing-pieces may be secured in this way. The bearing-pieces 23 are turned up at the ends to form flanges 24, in which the upper bent ends 25 of the bails 26 are pivoted, and the bails embrace the upper ends of the collar members and extend through keepers 27 on the covered back plate 28 of the pad 29, which pad may be of any approved construction or make, and is bent upward in the middle so as to fit nicely upon the horse's neck.

The construction just described enables the pad 29 to be moved freely in relation to the collar or the collar in relation to the pad, and as a result when the collar is in place upon the horse the usual movement of the collar will not be imparted to the pad and the horse's neck will not be chafed. The collar may be applied to the horse by pushing it over his head in the usual way, and in order that this may be easily done the finger or catch 22 may be turned up and the coupling-bars 14 pulled apart, thus allowing the collar to spread sufficiently to pass easily over the animal's head.

If it is desired to throw the collar wide open for any reason, the slotted bearing-piece 23 may be slipped from beneath the bolts which bind it in place, and this bearing-piece, which is connected by the bail with the pad 29, may be allowed to swing from the opposite member of the collar.

It will be understood that the coupling or fastening attachment may be applied to collars opening at the bottom as well as to those opening at the top.

Having thus described my invention, I claim as new and desire to secure by Letters Patent—

1. A collar provided at opposite sides of its upper end with two depending bails or links swinging toward and from the inner sides of the collar and a pad pivotally connected at its sides with the lower ends of the bails or links, substantially as set forth.

2. The combination, with the collar, of bearing-pieces secured to the collar at opposite sides of its upper end, bails suspended from said bearings to swing at their lower ends laterally between the two sides of the collar, and a pad pivotally connected at opposite sides with the lower ends of the bails, substantially as shown and described.

3. The combination, with the open-ended collar having bearing-pieces on each side of its opening, which bearing-pieces have flanged ends, of a pad suspended within the collar to freely swing laterally between the two sides thereof, and bails pivoted on the pad-back and pivoted in the flanges of the bearing-pieces, substantially as described.

4. The collar-pad having attaching-plates 23 23 for attachment to the collar at the sides of its top openings and bails pivoted to the said plates and through which bails the ends of the collar project, the lower ends of the bails being pivotally connected with the said pad, thus permitting it to swing freely toward and from the sides of the collar, substantially as described.

JOHN B. MUELLER.

Witnesses:
WM. C. GEIGER, Jr.,
GEO. W. FRANKS.